United States Patent
Loniak

(12) 
(10) Patent No.: US 6,805,441 B1
(45) Date of Patent: Oct. 19, 2004

(54) RIMLESS EYEWEAR

(75) Inventor: Jacob R Loniak, Los Angeles, CA (US)

(73) Assignee: Jorg Schuster, Huntington Beach, CA (US)

( * ) Notice: Subject to any disclaimer, the term of this patent is extended or adjusted under 35 U.S.C. 154(b) by 0 days.

(21) Appl. No.: 10/638,760

(22) Filed: Aug. 11, 2003

(51) Int. Cl.$^7$ ............................................. G02C 1/02
(52) U.S. Cl. ........................ 351/110; 351/140; 351/178
(58) Field of Search ................................. 351/110, 124, 351/140, 154, 178

(56) References Cited

U.S. PATENT DOCUMENTS

| | | | | |
|---|---|---|---|---|
| 2,269,307 A | * | 1/1942 | Dickerson | 209/467 |
| 5,646,706 A | * | 7/1997 | Izumitani | 351/110 |
| 5,861,933 A | * | 1/1999 | Bac | 351/110 |
| 6,199,981 B1 | * | 3/2001 | Chao | 351/110 |
| 2003/0206268 A1 | * | 11/2003 | Krumme | 351/110 |

* cited by examiner

*Primary Examiner*—Huy Mai

(57) ABSTRACT

This invention describes rimless eyewear constructed entirely without the use of adhesives or the need for mechanical attachments within the viewing aperture of the lens to attach eyewear components such as the bridge and endpieces to the lens.

20 Claims, 4 Drawing Sheets

RIMLESS EYEWEAR

CROSS REFERENCE TO RELATED APPLICATIONS

Not Applicable

STATEMENT REGARDING FEDERAL SPONSORED R & D

Not Applicable

REFERENCE TO A "MICROFICHE APPENDIX"

Not Applicable

BACKGROUND OF THE INVENTION

1. Field of the Invention

This invention describes rimless eyewear constructed entirely without the use of adhesives or the need for mechanical attachments within the viewing aperture of the lens to attach eyewear components such as the bridge and endpieces to the lens.

2. Description of Related Art

One of the main advantages of rimless eyewear, making them more desirable, is the wide, unobstructed field of view and lightness in weight afforded by their design. Most rimless eyewear is, however either semi-rimless eyewear in which lenses are suspended between eyewear components such as the bridge and endpieces by means of a thin flexible strand providing the function of a frame, or rim, or by is components mounted within the field of view using adhesives or mechanical attachments. If a flexible strand is not used, eyewear components such as the bridge and endpieces are usually supported by means of screws fitted into holes formed through the lens surface. The bridge provides the connection between the two lenses, and positions the eyewear over the nose. Endpieces are located at the outer edge of the lenses, and are the means by which the temples are connected to the lenses.

In one form of eyewear, the semi-rimless form described by Hirschmann et al, U.S. Pat. No. 6,217,169 B1, is not truly rimless in that a thin, flexible strand is wrapped around the lenses. It is to this strand that the bridge and endpiece components are attached by mechanical means. Even though the field of view is unobstructed, the flexible strand and its concomitant mechanical attachment does add weight to the eyewear.

Connor et al, U.S. Pat. No. 6,250,755 B1, Masunaga, U.S. Pat. No. 5,585,870, Yoshida, U.S. Pat. No. 6,485,141 B2 and U.S. Pat. No. 6,312,126 B1, and Tachibana, U.S. Pat. No. 6,007,200 and U.S. Pat. No. 6,210,002 B1, teach rimless eyewear construction wherein eyewear components such as the bridge and endpieces are attached to the lenses by mechanical means involving screws, pins or clamps. These points of attachment usually invade the field of view and add weight which further deters from the desirability.

In a similar fashion, Izumitami, U.S. Pat. Nos. 5,646,706, RE37,425 E, and RE37,461 E, teaches a similar rimless eyewear construction wherein eyewear components such as the bridge and endpieces are attached to the lenses by inserting and cementing pins into holes drilled in the lens itself. Even though elimination of the use of mechanical means of attachment minimizes the weight of the eyewear, it suffers from the same invasion of the field of view by holes and adhesive as described above.

Until the design and method described in this patent, no construction of rimless eyewear truly provides construction entirely without the use of adhesives or the need for mechanical attachments within the viewing aperture of the lens to attach eyewear components such as the bridge and endpieces to the lens.

SUMMARY OF THE INVENTION

Objective And Advantages

This invention describes rimless eyewear constructed entirely without the need for drilling, or the use of adhesives or mechanical attachments within the viewing aperture of the lens to attach eyewear components such as the bridge and endpieces to the lens.

Until the design and method described in this patent, no construction of rimless eyewear truly provides construction entirely without the use of adhesives or the need for mechanical attachments within the viewing aperture of the lens to attach eyewear components such as the bridge and endpieces to the lens. By taking advantage of modern techniques of thermal fusion, actual eyewear components made of plastic, plastic/metal or hybrid material may be directly caused to form bond with one another. Thermally fused bonds are 90%–95% as strong as the material itself.

Since the thermal fusion takes place at and between the surfaces of the joined components, components such as the bridge and endpieces can be attached directly to the edge of the lens, keeping the component completely outside of the viewing aperture. Also, since no mechanical means is use, the weight of the finished eyewear is minimized.

The process of thermally fusing materials together is commonly termed as welding. There are numerous techniques used for thermally fusing or welding plastic components together, such as for example, vibration welding, sonic welding, laser welding, particle magnetic welding, and plate welding. All provide similar results. All thermal fusion, or thermal welding, techniques are based on locally heating the junction to a temperature beyond the point where the material softens. The heated materials form a puddle of soft plastic wherein the materials make contact called plastization or liquidification. The liquefied materials are commingled at the junction when pressure is applied pushing the components together.

DESCRIPTION OF THE DRAWINGS

The details and many of the advantages provided by this invention will become clear and will be better understood by reviewing the following description and accompanying drawings, wherein.

DETAILED DESCRIPTION

In the following description, the preferred embodiment will be described with reference to the drawings and element numbers.

Figure 1:
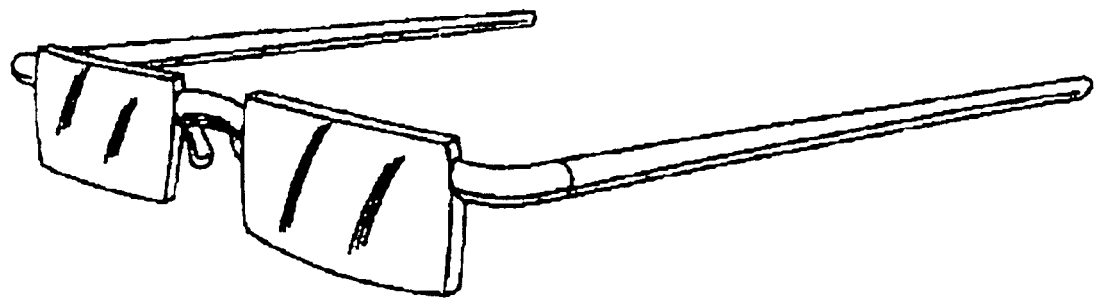
FIG. 1 is an overview the rimless eyewear constructed entirely without the use of adhesives or the need for mechanical attachments within the viewing aperture of the lens to attach eyewear components directly to the lens.

As shown in FIG. 1, the primary embodiment of rimless eyewear is constructed entirely without the use of adhesives or without the need for drilling or mechanical attachments within the viewing aperture of the lens having the eyewear components attached directly to the lens.

Figure 2:
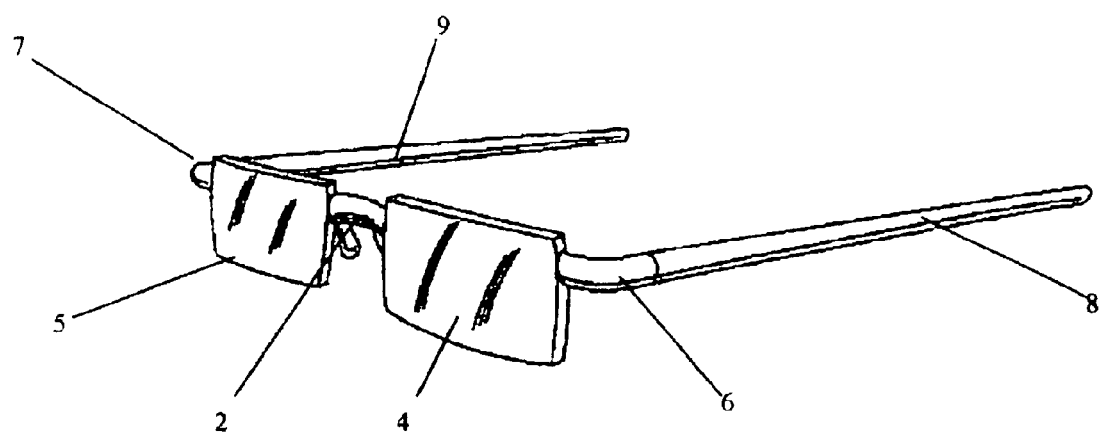
FIG. 2 is an overview the primary embodiment of rimless eyewear constructed entirely without the use of adhesives showing the attachment of eyewear components such as for example the bridge, the endpieces, and the temples.

FIG. 2 shows the symmetrical placement of eyewear components about the central component, the bridge 2. Components located on the left side of the head when the eyewear is worn are referred to as left components, and those located on the right side of the head when the eyewear is worn are referred to as the right components. The bridge 2 is attached directly to the left lens 4 and directly to the right lens 5 outside the viewing aperture using fusion or thermal welding techniques such as for example ultrasonic, sonic, plate, laser, magnetic particle, induction or other thermal welding processes that cause the component materials to melt and fuse together at their junction. The preferred embodiment includes weld type joints, such as for example, butt joint welds, shear or step joint welds, and tongue and groove joint welds.

In a similar manner, the left endpiece 6 is attached directly to the left lens 4 and the right endpiece 7 is attached directly to the right lens 5 using fusion or thermal welding techniques such as for example ultrasonic, sonic, plate, laser, magnetic particle, induction or other thermal welding processes that cause the component materials to melt and fuse together at their junction. The preferred embodiment includes all weld type joints, such as for example, butt joint welds, shear or step joint welds, and tongue and grove joint welds.

FIG. 2 also shows a separate left temple 8 attached to the left endpiece 6, and a separate right temple 9 attached to the right endpiece 7 by mechanical means such as for example hinges, pins, screws and brackets since these attachments are outside the viewing aperture.

Figure 3:
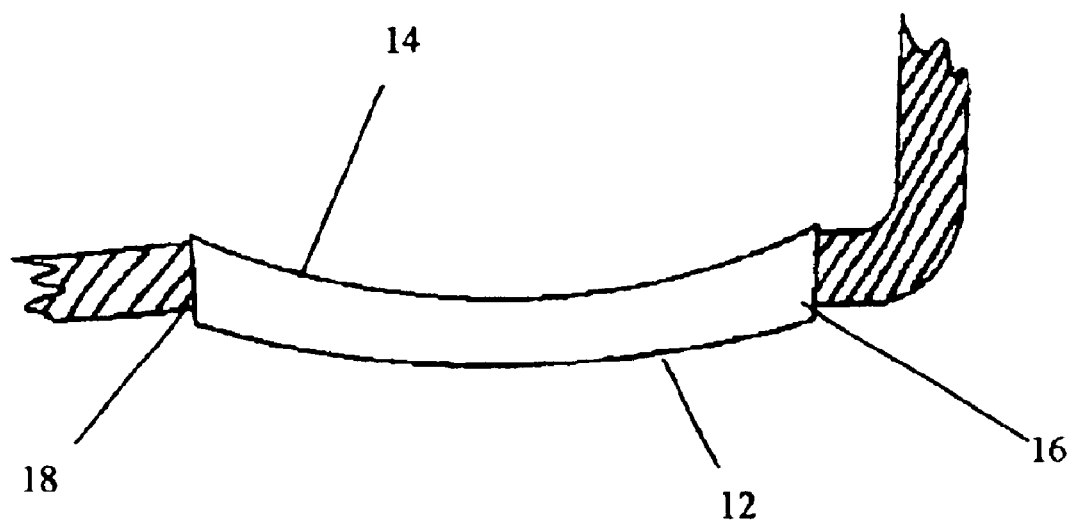
FIG. 3 is a top detail view of typical rimless eyewear lens showing the primary embodiment attachment of eyewear components such as for example the bridge and the endpieces directly to the lens.

FIG. 3 is top detailed view of one of the lenses shown in FIG. 2, and is typical of both lenses of the rimless eyewear. FIG. 3 shows the outside lens surface 12, the inside lens surface 14, and the outer lens edge 16 and the inner lens edge 18. It is the outside lens surface 12 and the inside lens surface 14 that defines the viewing aperture and defines the area that remains free of all attachments in this invention.

In the preferred embodiment, all attachment of components to the lenses takes place outside the viewing aperture, and uses fusion or thermal welding techniques such as for example ultrasonic, sonic, plate, laser, magnetic particle, induction or other thermal welding processes that cause the component materials to melt and fuse together at their junction. The preferred embodiment includes all types of weld joints such as for example butt joint welds, shear or step joint welds, and tongue and grove joint welds.

Materials included in the preferred embodiment are those thermoplastic materials that have structural, optical cosmetic qualities consistent with eyewear, such as for example polycarbonate or polystyrene, and have melting point temperatures within 30 degrees Fahrenheit of each other.

In the preferred embodiment, components shown in FIG. 2 that are not directly attached to the lens edge, such as temples 8 and 9, may use any common means of attachment.

Figure 4:
FIG. 4 is a top detail view of typical rimless eyewear lens showing the alternate embodiment attachment of eyewear components such as for example the bridge and the endpieces directly to the lens.

FIG. 4 is a top detail view of an alternate embodiment of rimless eyewear constructed wherein inner lug 20 is directly attached to inner lens edge 18 and outer lug 22 is directly attached to outer lens edge 16 entirely without the use of adhesives or the need for mechanical attachments within the viewing aperture of the lens to attach eyewear components to the lens.

In this alternative embodiment, all attachment of components to the lenses takes place outside the viewing aperture, and uses fusion or thermal welding techniques such as for example ultrasonic, sonic, plate, laser, magnetic particle, induction or other thermal welding processes that cause the component materials to melt and fuse together at their junction. The preferred embodiment includes all types of weld joints such as for example butt joint welds, shear or step joint welds, and tongue and groove joint welds.

Materials included in the preferred embodiment are those thermoplastic materials that have structural, optical cosmetic qualities consistent with eyewear, such as for example polycarbonate or polystyrene, and have melting point temperatures within 30 degrees Fahrenheit of each other.

In the alternate embodiment, components that are not directly attached to the lens' edge, such as endpieces 6 and 7, and temples 8 and 9, may use any common means of attachment.

What is claimed is:

1. Rimless eyewear consisting of
    a right lens and a left lens, said right lens having an inner edge and an outer edge and said left lens having inner edge and an outer edge, a right endpiece, said right endpiece having a first end and a second end, said first end of said right endpiece forming a thermally welded junction with said outer edge of said right lens,
    a left endpiece, said left endpiece having a first end and a second end, said first end of said left endpiece forming a thermally welded junction with said outer edge of said left lens,
    a bridge, said bridge having a right end and a left end, said right end of said bridge forming a thermally welded junction with said inner edge of said right lens and said left end of said bridge forming a thermally welded junction with said inner edge of said left lens,
    a right temple, said right temple having a first end and a second end, said first end of said right temple affixed to said right endpiece at said second end, and
    a left temple, said left temple having a first end and a second end, said first end of said left temple affixed to said left endpiece at said second end.

2. Rimless eyeware of claim 1 wherein the thermal weld technique is ultrasonic welding.

3. Rimless eyeware of claim 1 wherein the thermal weld technique is sonic welding.

4. Rimless eyeware of claim 1 wherein the thermal weld technique is laser welding.

5. Rimless eyeware of claim 1 wherein the thermal weld technique is magnetic particle welding.

6. Rimless eyeware of claim 1 wherein the thermal weld technique is induction welding.

7. Rimless eyeware claim 1 wherein the thermal weld technique is heated plate welding.

8. Rimless eyeware claim 1 wherein the junction is a butt weld junction.

9. Rimless eyeware of claim 1 wherein the junction is a shear or step weld junction.

10. Rimless eyeware of claim 1 wherein the junction is a tongue and grove weld junction.

11. Rimless eyewear consisting of
    a right lens and a left lens, said right lens having an inner edge and an outer edge and said left lens having inner edge and an outer edge, an left inner lug, said left inner lug having a first end and a second end, said first end of said left inner lug forming a thermally welded junction with said inner edge of said left lens, an right inner lug, said right inner lug having a first end and a second end, said first end of said right inner lug forming a thermally welded junction with said inner edge of said right lens, a left outer lug, said left outer lug having a first end and a second end, said first end of said left outer lug forming a thermally welded junction with said outer edge of said left lens, a right outer lug, said right outer lug having a first end and a second end, said first end of said right outer lug forming a thermally welded junction with said outer edge of said right lens, a right endpiece, said right endpiece having a first end and a second end, said right endpiece affixed to said second end of said right lug, a left endpiece, said left endpiece having a first end and a second end, said left endpiece affixed to said second end of said left lug, a right temple, said right temple having a first end and a second end, said right temple affixed to said second end of said right endpiece, and left temple, said left temple having a first end and a second end, said left temple affixed to said second end of said left endpiece.

12. Rimless eyeware of claim 11 wherein the thermal weld technique is ultrasonic welding.

13. Rimless eyeware of claim 11 wherein the thermal weld technique is sonic welding.

14. Rimless eyeware of claim 11 wherein the thermal weld technique is laser welding.

15. Rimless eyeware of claim 11 wherein the thermal weld technique is magnetic particle welding.

16. Rimless eyeware of claim 11 wherein the thermal weld technique is induction welding.

17. Rimless eyeware of claim 11 wherein the thermal weld technique is heated plate welding.

18. Rimless eyeware of claim 11 wherein the junction is a butt weld junction.

19. Rimless eyeware of claim 11 wherein the junction is a shear or step weld junction.

20. Rimless eyeware of claim 11 wherein the junction is a tongue and grove weld junction.

* * * * *